United States Patent [19]

Kundrat

[11] Patent Number: 5,234,490
[45] Date of Patent: Aug. 10, 1993

[54] OPERATING A BLAST FURNACE USING DRIED TOP GAS

[75] Inventor: David M. Kundrat, Cincinnati, Ohio
[73] Assignee: Armco Inc., Middletown, Ohio
[21] Appl. No.: 799,790
[22] Filed: Nov. 29, 1991
[51] Int. Cl.$^5$ ............................................. C21B 5/06
[52] U.S. Cl. ................................ 75/464; 75/468; 266/156
[58] Field of Search ................ 75/707, 459, 460, 461, 75/462, 463, 464, 467, 468; 266/156

[56] References Cited

U.S. PATENT DOCUMENTS

| | | | |
|---|---|---|---|
| 1,755,845 | 4/1930 | Snyder | 75/468 |
| 3,844,677 | 5/1975 | Wenzel et al. | |
| 4,171,971 | 10/1979 | Brotzmann et al. | 75/464 |
| 4,198,228 | 4/1980 | Jordan | |
| 4,248,627 | 2/1981 | Blumenthal et al. | 75/459 |
| 4,266,968 | 5/1981 | Daldrup | 75/464 |
| 4,844,737 | 7/1989 | Oono et al. | |
| 4,917,727 | 4/1990 | Saito et al. | 75/460 |
| 4,985,075 | 1/1991 | Ohno et al. | 75/460 |

FOREIGN PATENT DOCUMENTS 817647 11/1974 Belgium.
302041 4/1989 European Pat. Off.
444802 12/1974 U.S.S.R.
1216779 12/1970 United Kingdom.

OTHER PUBLICATIONS

A. Poos, The Future of the Blast Furnace, 1990, pp. 395-404, 6th Inst. I & S Congress.
D. M. Kundrat et al, Injections in the Iron Blast Furnace: A Graphics Study by Means of the Rist Operating Diagram, 1991, pp. 363-383, Metallurgical Transactions B.

Primary Examiner—Melvyn J. Andrews
Attorney, Agent, or Firm—R. J. Bunyard; L. A. Fillnow; R. H. Johnson

[57] ABSTRACT

Method of producing pig iron in a blast furnace. At least a portion of a top gas from a blast furnace is collected, dried and then heated to an elevated temperature preferably in the range of 900°-1000° C. An oxygen-enriched hydrogenaceous fuel is introduced into the furnace bosh and the heated dried top gas is introduced into the lower half of the furnace stack above the furnace bosh at a point above which the coke in the furnace is not reactive.

21 Claims, 1 Drawing Sheet

OPERATING A BLAST FURNACE USING DRIED TOP GAS

BACKGROUND OF THE INVENTION

The invention relates to a method of reducing metal oxide in a blast furnace using an untreated top gas and an oxygen-enriched hydrogenaceous fuel. More particularly, the invention includes introducing an untreated heated top gas into the lower half of a blast furnace stack and introducing an oxygen-enriched hydrogenaceous fuel into a blast furnace bosh.

The growth of so-called "minimills" has been rapid in recent years. One reason for this growth is because minimills produce steel by remelting ferrous scrap in an electric furnace rather than using molten pig iron produced in a blast furnace. On the other hand, most fully integrated large steel manufacturers require molten pig iron as a charge material for a steel converter such as a basic oxygen furnace. One of the primary reasons why blast furnaces no longer are being constructed in North America is because of the huge capital investment required. This not only includes capital for the furnace itself but also related equipment such as stoves for heating blast air and a coke producing oven. Another disadvantage is the maintenance expense associated with the stoves required to heat the blast air.

British patent 1,216,779 discloses a method of operating a blast furnace at a pressure of at least 75 psi to produce molten pig iron. Oxygen, steam and optional fuel oil are blown through blast furnace tuyeres. Carbon dioxide allegedly is removed from the top gas using a scrubber and the remaining gas is recycled to the base of the furnace at a pressure exceeding that within the furnace. The patent discloses the need for blast furnace stoves may be reduced or eliminated.

A major disadvantage associated with the operation of a blast furnace is the high energy cost associated with the use of coke in the furnace burden. The environmental problems associated with coke ovens for producing coke are well known. There has been much effort in recent years to reduce the consumption of coke and to increase the output of blast furnaces. Coke consumption in the furnace can be reduced by recycling the furnace generated top gas. Since top gas contains large amounts of carbon dioxide and water, this gas first must be re-generated with a carbon-containing material such as methane to make it more reducing before it can be injected into the furnace bosh. However, this requires the added capital expense of either a reformer or a gas separation unit. Accordingly, top gas generally is used for firing the stoves but not for reducing metal oxide in the furnace. Coke consumption also can be reduced by blowing carbonaceous and hydrogenaceous materials along with hot blast air into the furnace. A disadvantage of this process can be the large amount of heat required to combust the fuel to produce a reducing gas. The more endothermic the injected fuel, the more oxygen enrichment of the blast is needed to sustain the flame temperature at the tuyeres.

U.S. Pat. No. 4,884,677 discloses a method of operating a blast furnace to produce molten pig iron using an oxygen-enriched fuel and recycling regenerated top gas to the furnace. Top gas is reformed to carbon monoxide and hydrogen using a fossil fuel. The regenerated top gas, oxygen and fuel are blown through the bosh tuyeres. A portion of the regenerated top gas may be blown through the furnace stack. The temperature of the regenerated top gas may be raised to 1500° C. and the temperature of the oxygen and fuel raised to 500° C.

U.S. Pat. No. 4,844,737 discloses operating a blast furnace to produce molten pig iron using an oxygen-enriched fuel and recycling heated top gas to the furnace. A reducing gas containing at least 40% by vol. oxygen and pulverized coal having predetermined fuel and coal ratios are blown through the bosh tuyeres. A top gas having a temperature of 1000° C. to heat the furnace burden is blown through inlets set in the furnace shaft portion.

U.S. Pat. No. 4,917,727 discloses a method of operating a blast furnace to produce molten pig iron using an oxygen-enriched fuel and recycling heated top gas to the furnace. Pure oxygen, pulverized coal and a temperature control gas are blown through the bosh tuyeres. A preheating gas is blown through an intermediate portion of the furnace stack to increase the gas flow within the furnace and to preheat the furnace burden. The temperature control gas and the preheating gas are top gas with the latter being combusted.

Nevertheless, there remains a long felt need to reduce the capital cost for the equipment associated with an efficient blast furnace operation. There further remains a need to reduce operating costs by reducing the amount of coke required in the operation of a blast furnace.

BRIEF SUMMARY OF THE INVENTION

The invention relates to a method of reducing metal oxide in a blast furnace. The method includes introducing into the top of the furnace a charge containing metal oxide, coke and flux, collecting a top gas from the furnace, drying at least a portion of the top gas, heating the dried top gas, introducing the dried top gas into the lower half of the stack of a blast furnace and introducing an oxygen-enriched hydrogenaceous fuel into the blast furnace bosh.

Preferably, the dried top gas is heated in the range of 900°–1000° C. The hydrogenaceous fuel may be any hydrocarbon with the hydrocarbon being a gas, a gas solid mixture or a gas liquid mixture.

A principal object of the invention includes reducing capital cost for the equipment associated with a blast furnace.

Another object of the invention is to reduce coke consumption during the operation of a blast furnace.

Additional objects of the invention include reducing the operating cost and increasing the productivity of a blast furnace.

A feature of the invention includes introducing into the top of a blast furnace a charge containing metal oxide, coke and flux, collecting a top gas from the furnace, drying at least a portion of the top gas, heating the dried top gas, introducing the dried top gas into the lower half of the stack of a blast furnace and introducing an oxygen-enriched hydrogenaceous fuel into the furnace bosh, whereby the metal oxide is reduced to a molten metal using an untreated top gas.

Another feature of the invention is for the dried top gas of the aforesaid feature to be heated in the range of 900°–1000° C.

Another feature of the invention is for the hydrogenaceous fuel of the aforesaid feature to include a molar ratio of carbon:hydrogen in the range of 0.5–2.5.

Another feature of the invention is for the dried top gas of the aforesaid feature to be introduced into the furnace at a position where the coke is not reactive.

Another feature of the invention is for the oxygen-enriched hydrogenaceous fuel of the aforesaid feature to be at ambient temperature.

Another feature of the invention is for the dried top gas of the aforesaid feature to contain ≦3 vol. % water.

Another feature of the invention is for the furnace of the aforesaid the feature to have a physical raceway adiabatic flame temperature in the range of 1750°–2100° C.

Another feature of the invention is for the hydrogenaceous fuel of the aforesaid feature to include natural gas.

An advantage of the invention includes decreased capital cost of a new blast furnace or minimal capital cost to modify an existing blast furnace since a smaller preheater stove is substituted for the larger blast stoves. Additional advantages include decreased operating cost of a blast furnace owing mainly to decreased charge material cost because coke usage is decreased, and increased productivity.

The above and other objects, features and advantages of the invention will become apparent upon consideration of the detailed description and appended drawing.

BRIEF DESCRIPTION OF THE DRAWING

The drawing is a schematic view of a blast furnace operation illustrating one embodiment of the invention.

DETAILED DESCRIPTION OF THE PREFERRED EMBODIMENT

Figure 1:
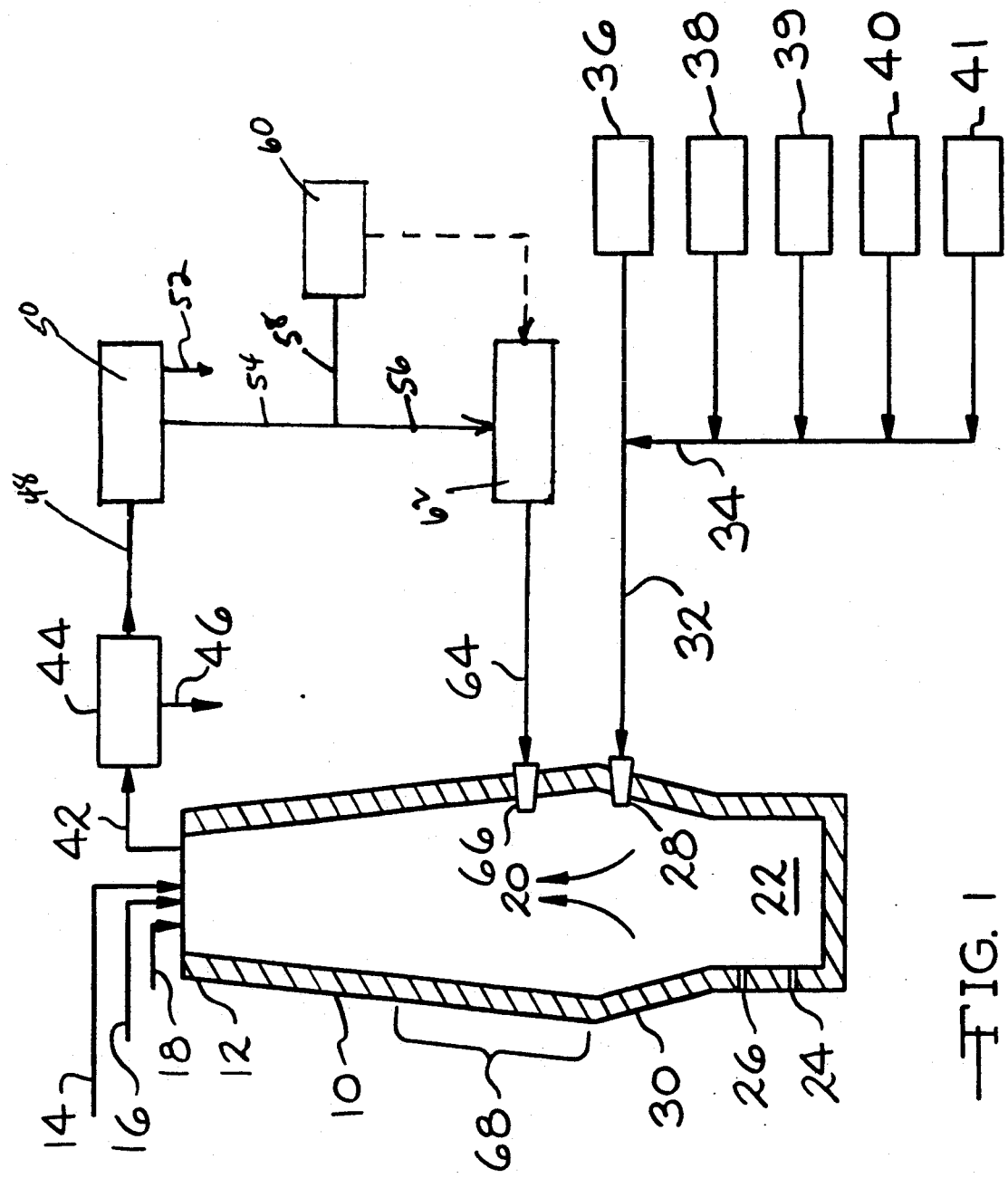

A principal object of the invention is to reduce coke consumption during the operation of a blast furnace with the least capital expenditure. I have discovered that nearly half of the coke in the blast furnace can be replaced by introducing an oxygen-enriched hydrogenaceous fuel into the furnace bosh and constant thermal conditions in the stack can be maintained by simultaneously introducing an "untreated" heated top gas into the lower half of the furnace stack. This oxygen-enriched hydrogenaceous fuel and untreated top gas replaces nitrogen previously originating from a hot air blast.

As discussed in more detail below, using a hydrogenaceous fuel allows a significant portion of waste gas in the top gas to be removed and recycling a dry top gas does not impede the reducing power of the reducing gases in the furnace. A preferred hydrogenaceous fuel is natural gas ($CH_4$). However, since natural gas is a potent coolant, substantial blast oxygen enrichment is required to maintain the raceway adiabatic flame temperature (RAFT). The hydrogenaceous fuel may include other gases such as ethane ($C_2H_6$), propane ($C_3H_8$), butane ($C_4H_{10}$), ethylene ($C_2H_4$), acetylene ($C_2H_2$), and the like or mixtures thereof including mixtures with natural gas. It will be understood the hydrogenaceous fuel also may be pulverized high volatile coal, or may include a mixture of one or more of the above mentioned gases and/or hydrogen in combination with solid carbon such as pulverized low volatile coal, pulverized coke, coal breeze, coke breeze or graphite. Alternatively, the hydrogenaceous fuel may include a mixture of one or more of the above mentioned gases and/or hydrogen in combination with liquid carbon such as tar, oil or alcohol.

By untreated top gas is meant top gas that has been cleaned and dried but not reformed, oxidized or subjected to a chemically based or pressure based gas separation process. That is, it is not necessary to remove or reduce to carbon monoxide the waste carbon dioxide contained in the top gas before recycling. The top gas may be dried by quenching so that most of the water is removed. The gas may be further dried by passing through a dehumidifier. Preferably, the top gas is quenched at room temperature so that a dry top gas having less than about 3 vol. % water is formed. Since the dried top gas is reducing relative to the oxides $Fe_2O_3$ and $Fe_3O_4$ upon heating, it can be injected into the lower half of a blast furnace when producing molten pig iron to mix with the reducing gases rising from the bosh without compromising the net reducing potential. In fact, the net reducing potential of the mixed gas is significantly higher than compared to that in a conventional blast furnace practice as a result of the large injection of fuel into the bosh. The injected top gas not only heats the burden descending through the furnace but also takes part in the reducing reaction of the metallic oxide contained in the burden.

The heated top gas is injected into any portion of the lower furnace stack where the coke in the furnace is not reactive, preferably at that point of the stack at which the coke is just becoming reactive. By reactive coke is meant being at a temperature above which the coke reacts with carbon dioxide and water to form carbon monoxide and hydrogen. This reaction should be minimized in the stack because it unduly enriches the reducing gas at the expense of consuming coke and is endothermic. The region of the furnace stack where the contained coke becomes non-reactive is just above that position where the temperature of the coke is less than about 1000° C. and preferably about 950° C. When referring to coke temperature, it will be understood this is meant to be average temperature of the coke. Thus, the heated dry top gas will always be injected at a position into the stack above where the oxygen-enriched hydrogenaceous fuel is injected, since the temperature of the coke near the bosh tuyeres is greater than about 1200° C.

The reducing potential of the net stack gas is not compromised and is, in fact, enhanced by controlling the molar ratio of carbon:hydrogen of the bosh injectant, and in part by the elimination of nitrogen from the blast. By controlling the molar ratio of carbon:hydrogen in the hydrogenaceous fuel to no greater than about 2.5, a sufficient amount of oxygen is removed from the metallic oxide charge material in the furnace stack by hydrogen to permit the oxidation state of the dry top gas to increase by less than 10% than that of the gases rising from the lower half of the furnace. Thus, when injected low into the furnace stack so that the recycled top gas mixes with the insitu formed bosh gas having about the same oxidation state and temperature, reduction in the furnace is not compromised. Preferably, the molar ratio of carbon:hydrogen is no greater than about 0.5, i.e., that of $CH_4$. By elimination of blast nitrogen, a much greater proportion of the net stack gas is reducing gas so that the reducing potential of the stack gas is increased substantially for the same internal pressure.

Conventional wisdom suggests "untreated" top gas should not be recycled into a blast furnace because the ratio $(CO+H_2)/(CO_2+H_2O)$ in the top gas typically is less than unity. Introducing carbon dioxide into the furnace stack may adversely effect the metallic oxide reaction process if the reducing potential of the stack gas is reduced. I have determined, however, the reducing potential of the mixed gases after recycling of untreated top gas containing residual carbon dioxide that is not reformed, oxidized or subjected to a gas separation process is considerably higher than that of a conventional blast furnace operation. In the case of the invention where the fuel injected into the bosh is natural gas, the ratio $(CO+H_2)/(CO_2+H_2O)$ of the recycled gas is no less than 1.5. This increased level of reducing gas results from removal of water from the top gas. At the same time, the thermal deficit in the furnace stack from the elimination of blast nitrogen is minimal due to the increased amount of reducing gas arising from the bosh injection. The volume of top gas required to be recycled to meet this deficit is surprisingly small, e.g., about one-third the volume generated during operation of the blast furnace, compared to the volume of air previously heated in the stoves. The volume of top gas required to be recycled can be heated using a standard preheater such as a pebble stove.

Since a hydrogenaceous fuel is used, a larger portion of the reducing gas of the invention is hydrogen. Condensation of the top gas (quenching/dehumidifying) removes a significantly larger portion of the waste gas, e.g., water, than in a conventional process.

The drawing illustrates one embodiment for carrying out the present invention with numeral 10 generally illustrating a blast furnace for reducing metal oxide to molten metal. The oxides for which the present invention can be used include iron, magnesium and lead. Materials including the metal oxide are charged into the upper portion 12 of furnace 10. For a blast furnace operation producing molten pig iron, the charge materials normally include an iron ore 14, a solid reductant 16, e.g., coke, and a fluxing material 18, e.g., limestone. The charge materials slowly pass downwardly through the stack of furnace 10 with the metal oxide initially being heated to a reaction temperature generally in the upper half of the furnace. In conventional blast furnace practice, the metal oxide is reduced to metal generally in the lower half of the furnace by hot reducing gases 20. Reducing gases 20 are formed when oxygen contained in hot blast air injected into the lower portion of furnace 10 reacts with the coke contained in the furnace stack. By the time the charge materials reach the bottom of furnace 10, the reductant has been consumed, the metal has been melted to a molten metal 22 and most of the impurities in the metal oxide have been fluxed to form a molten slag on the surface of molten metal 22. Periodically, molten metal 22 is withdrawn from furnace 10 through a tap hole 24 and the slag is withdrawn through a top hole 26. The hot blast air normally is injected into the lower portion of furnace 10 through tuyeres 28 annularly disposed in bosh 30.

In the present invention, hot blast air is replaced with an oxygen-enriched hydrogenaceous fuel 32. Oxygen-enriched hydrogenaceous fuel 32 is a mixture of an oxygen-containing gas 36 and a hydrogenaceous fuel 34. By oxygen-containing gas is meant having at least 70 vol. % oxygen with the balance being essentially nitrogen. Hydrogenaceous fuel 34 can be a gaseous hydrocarbon 38, a mixture of gaseous hydrocarbon 38 and a solid carbon 39, a mixture of gaseous hydrocarbon 38 and a liquid carbon 40 or mixtures thereof. Alternatively, hydrogenaceous fuel 34 also can be a mixture of gaseous hydrocarbon 38 and/or hydrogen 41 and solid carbon 39 or liquid carbon 40.

Top gas 42 at the completion of the reduction process is collected in a gas-solids separator 44 where solids 46 such as soot and dust are eliminated. Cleaned moist gas 48 then is passed through means 50 for removing water 52. Water removing means 50 may include a condenser for quenching the top gas to room temperature and/or a dehumidifier. A portion 56 of dry top gas 54 is passed through a preheater 62 with a heated dry top gas 64 then being compressed and returned to furnace 10 through tuyeres 66 annularly disposed in the lower half 68 of the furnace. A remaining portion 58 of cleaned dry top gas 54 may be sent to a gas holder 60. For an iron-making blast furnace operation of the invention, about one-third by volume of dry top gas 54 is recycled to preheater 62. The remaining portion 58 may be used for firing preheater 62 or elsewhere if the blast furnace is part of an integrated steel plant. Dry heated top gas 64 must be delivered at sufficient pressure through tuyeres 66 to penetrate into the bed of charge materials descending through the furnace stack.

A conventional blast furnace requires stoves for heating blast air before being injected into the furnace. One of the advantages of the present invention is the elimination of this requirement. The oxygen and hydrogenaceous fuel mixture of the invention preferably is injected into the furnace at ambient temperature unless the oxygen-hydrogenaceous fuel mixture includes liquid 40 such as tar or oil in which case it may be necessary to heat the liquid. The needed thermal input for maintaining constant thermal conditions in the furnace stack is achieved by heating dried recycled top gas 64. As discussed in detail below, dried top gas 64 preferably is heated to the range of 900°–1000° C.

A thermochemical model based on heat and mass balances of a blast furnace process was used to evaluate coke usage for the simultaneous injection of recycled heated dry top gas and an oxygen-enriched hydrogenaceous fuel of the invention. A description of the basis of the model is disclosed in *Metallurgical Transactions* B, Vol. 22B, June 1991, pp. 363-383. In the examples that follow, examples A and B are illustrative of conventional blast furnace processes and examples C-I are illustrative of blast furnace processes of the invention. The parameters for operating a blast furnace to be charged with iron ore, coke and limestone to produce molten pig iron are shown in Table 1. These parameters were entered into the computer program based on a modification of the published model with the calculated results being shown in Table 2. It should be noted that while the modified model facilitates calculations of the invention, use of the model is not essential for the invention. Simple heat and mass balances may be calculated from the description of the invention to demonstrate its feasibility. In examples A and B, no fuel is injected into the furnace. Coke in the furnace charge material is the only fuel used to combust heated blast air injected through the bosh tuyeres and none of the produced top gas is recycled to the furnace. In examples C-I, the blast furnace is operated without blast air with an oxygen-enriched hydrogenaceous fuel being injected into the furnace bosh and recycling a portion of the top gas to the lower half of the furnace stack instead. Top gas temperature is an input parameter in the modified model. This temperature is set at 155° C. for all the examples except in example A where this temperature is 201° C. because of blast moisture. In these examples, the top gas is cleaned and dried to remove essentially all the water and then reheated to 950° C. such as by using a preheater. In these examples, solid carbon 39 such as coal or liquid carbon 40 such as oil are not injected into furnace 10. Untreated heated top gas 64 is recycled by being injected into lower half 68 of the furnace stack at a position above furnace bosh 30 where the coke would not be reactive. The only difference between examples A and B is that the hot blast air of example B is assumed to be dry.

The purity of injected oxygen-containing gas 36 of the invention (Table 2) is not a parameter of the model but a calculated result. This is seen to vary between 71.3 vol. % $O_2$ for example I to 99.6 vol. % $O_2$ for example E, with the balance being essentially nitrogen. The oxygen-containing gas is injected at ambient temperature (blast temperature) except in examples D, F and H where the oxygen-containing gas is injected at a temperature of 950° C. Hydrogenaceous fuel 34 in all the examples is gaseous hydrocarbon 38, e.g., natural gas (as $CH_4$). The natural gas is injected at ambient temperature (bosh injection temperature taken as 25° C.) except in examples E, F and I where it is injected at a temperature of 950° C. Examples C-F assume as a model parameter an "effective" RAFT of 1750° C. while examples G-I assume an "effective" RAFT of 1580° C. to illustrate the benefits when a lower RAFT is used. The effective RAFT includes reducing gas from the solution-loss reaction with coke in the bosh, i.e., $CO_2 + C = 2CO$. The effective RAFT in the calculation of RAFT is about 300° C. lower than the standard physical RAFT given as an output from the model in Table 2. In example C, neither the oxygen-containing gas nor the natural gas is heated. In example D, the oxygen-containing gas is at 950° C. and the natural gas is at ambient temperature. In examples E and F, the oxygen-containing gas is at ambient temperature and 950° C. respectively with the fuel being reformed natural gas (reformed at 950° C.). Examples G-I are the same as C-E except at a lower effective RAFT of 1580° C. No example using a 1580° C. effective RAFT and otherwise similar to example F was calculated.

TABLE 1

|  | PARAMETERS | | | | | | | | |
|---|---|---|---|---|---|---|---|---|---|
|  | CONTROL | | | | | | | | |
|  | A | B | C | D | E | F | G | H | I |
| moles blast $H_2O$/atom blast oxygen | 0.075 | 0 | 0 | 0 | 0 | 0 | 0 | 0 | 0 |
| blast temperature - °C. | 950 | 950 | 25 | 950 | 25 | 950 | 25 | 950 | 25 |
| bosh injection temperature - °C. | — | — | 25 | 25 | 950 | 950 | 25 | 25 | 950 |
| effective RAFT - °C. | 1750 | 1950 | 1750 | 1750 | 1750 | 1750 | 1580 | 1580 | 1580 |
| moles $CH_4$ (at 25° C.) injected in bosh/mole Fe | — | — | 0.535 | 0.600 | 0 | 0 | 0.620 | 0.695 | 0 |
| moles reformed $CH_4$ (at 950° C.) injected in bosh/mole Fe | — | — | 0 | 0 | 0.610 | 0.650 | 0 | 0 | 0.690 |
| top gas temperature - °C. | 201 | 155 | 155 | 155 | 155 | 155 | 155 | 155 | 155 |

TABLE 2

|  | RESULTS | | | | | | | | |
|---|---|---|---|---|---|---|---|---|---|
|  | CONTROL | | | | | | | | |
|  | A | B | C | D | E | F | G | H | I |
| Flows | | | | | | | | | |
| reducing gas - moles CO + $H_2$/moles Fe | 2.046 | 1.857 | 2.936 | 2.932 | 2.908 | 2.915 | 3.111 | 3.103 | 3.056 |
| tuyere oxygen - atom oxygen/mole Fe | 1.348 | 1.309 | 1.746 | 1.613 | 0.964 | 0.849 | 1.820 | 1.662 | 0.936 |
| solution-loss - moles oxygen/mole Fe | 0.441 | 0.499 | 0.070 | 0.069 | 0.064 | 0.066 | 0.001 | 0.001 | 0.000 |
| tuyere reducing gas - moles CO + $H_2$/mole Fe | 1.550 | 1.309 | 2.816 | 2.813 | 2.794 | 2.799 | 3.061 | 2.816 | 3.006 |
| Top Gas - Total | | | | | | | | | |
| —CO—$CO_2$—$H_2$— and —$N_2$ moles/mole Fe | 0.938 | 0.856 | 1.256 | 1.146 | 1.123 | 1.059 | 1.100 | 0.975 | 0.950 |
| —CO—$CO_2$—$H_2$— and —$N_2$ moles/mole Fe | 1.007 | 1.002 | 1.608 | 1.542 | 1.534 | 1.488 | 1.477 | 1.400 | 1.381 |
| —CO—$CO_2$—$H_2$— and —$N_2$ moles/mole Fe | 0.049 | 0 | 1.065 | 1.181 | 1.205 | 1.272 | 1.130 | 1.244 | 1.231 |
| —CO—$CO_2$—$H_2$— and —$N_2$ moles/mole Fe | 2.536 | 2.462 | 0.014 | 0.011 | 0.003 | 0.007 | 0.192 | 0.206 | 0.262 |
| top gas recycle rate | — | — | 0.348 | 0.355 | 0.365 | 0.366 | 0.274 | 0.279 | 0.281 |
| Top Gas - Recycled to Stack | | | | | | | | | |
| moles/mole Fe | — | — | 0.483 | 0.407 | 0.409 | 0.388 | 0.301 | 0.272 | 0.267 |
| moles/mole Fe | — | — | 0.560 | 0.548 | 0.559 | 0.545 | 0.405 | 0.391 | 0.388 |
| moles/mole Fe | — | — | 0.371 | 0.424 | 0.439 | 0.469 | 0.310 | 0.347 | 0.346 |
| moles/mole Fe | — | — | 0.005 | 0.004 | 0.001 | 0.003 | 0.053 | 0.057 | 0.074 |
| recycle rate to stack | — | — | 0.348 | 0.355 | 0.365 | 0.366 | 0.274 | 0.279 | 0.281 |
| BLAST CONDITIONS | | | | | | | | | |
| vol. % $O_2$ | 21.0 | 21.0 | 99.0 | 99.1 | 99.6 | 99.0 | 86.7 | 84.9 | 71.3 |
| moles blast $N_2$/(O + $H_2$) | 1.636 | 1.881 | 0.005 | 0.004 | 0.002 | 0.005 | 0.077 | 0.089 | 0.201 |
| blast moisture - grains/SCF | 10.2 | 0 | 0 | 0 | 0 | 0 | 0 | 0 | 0 |
| Other | | | | | | | | | |
| physical RAFT - °C. | 2058 | 2244 | 2097 | 2096 | 2095 | 2096 | 1880 | 1879 | 1875 |
| Efficiency | | | | | | | | | |
| coke rate - kg./MTHM | 499 | 457 | 318 | 295 | 266 | 258 | 297 | 270 | 232 |
| net coke rate saved - kg./MTHM | — | — | 181 | 204 | 238 | 242 | 203 | 230 | 267 |
| Coke - MT/MTHM | — | — | 0.091 | 0.102 | 0.189 | 0.121 | 0.102 | 0.115 | 0.134 |
| net coke rate saved - % | — | — | 36.3 | 40.9 | 47.6 | 48.4 | 40.6 | 46.0 | 53.5 |

TABLE 2-continued

|  | CONTROL | | RESULTS | | | | | | |
| --- | --- | --- | --- | --- | --- | --- | --- | --- | --- |
|  | A | B | C | D | E | F | G | H | I |
| prod. change prop. to bosh gas vol. - % | — | — | 35.8 | 35.9 | 36.6 | 36.4 | 29.1 | 29.1 | 29.3 |
| Fuel Consumption | | | | | | | | | |
| natural gas - $Nm^3$/MTHM | — | — | 201 | 225 | 229 | 244 | 233 | 261 | 259 |
| $O_2$ - MT/MTHM | — | — | 0.468 | 0.428 | 0.340 | 0.312 | 0.469 | 0.425 | 0.317 |
| Top Gas Utilization | | | | | | | | | |
| % injected in stack | — | — | 34.8 | 35.5 | 36.5 | 36.6 | 27.4 | 27.9 | 28.1 |
| % to preheat gas recycled to stack | — | — | 19.0 | 21.0 | 19.0 | 19.1 | 15.4 | 15.4 | 15.9 |
| % to fire blast stoves | — | — | 0 | 11.2 | 0 | 5.1 | 0 | 12.1 | 0 |
| % for reforming natural gas | — | — | 0 | 0 | 15.6 | 16.6 | 0 | 0 | 19.4 | blast temperature - injection temperature of oxygen containing gas
bosh injection temperature - injection temperature of hydrogenaceous fuel Examination of Table 2 shows for all the examples C-I of the invention the projected % savings in coke usage over that required in the conventional operation of example A is at least 36%. The greatest per cent savings in coke usage is about 54% for example I having an oxygen purity of 71.3 vol. %. This corresponds to a coke rate when using natural gas as the hydrogenaceous fuel of only 232 kg/NTHM. Even though the oxygen-containing gas is not heated, the hydrogenaceous fuel would have been reformed at a temperature of 950° C. Only about 28 vol. % of the top gas in example I needs be recycled to the stack to maintain constant thermal conditions. For a blast furnace operation according to example I, blast stoves can be eliminated and a small preheater having a capacity of about 93,000 $Nm^3$/hr would be required for a 5500 NT/day capacity blast furnace. A reformer for natural gas would be required for example I.

Example G is the same as example I except the hydrogenaceous fuel is not reformed. This requires the oxygen purity of the oxygen-containing gas to be increased to about 87 vol. % for the same RAFT. The projected % savings in coke usage over that required in the conventional operation of example A is 46%. If RAFT is increased, the oxygen purity of the oxygen-containing gas needs to be increased up to its limit of 99+ vol. %, e.g., example C, with the projected % savings in coke usage being 36% over that required in example A and the amount of top gas needing to be recycled to the stack being 35 vol. %. Thus, the lower RAFT is more desirable. The lowest known operable physical RAFT in a commercial blast furnace operation is about 1750° C.

The preferred mode of operation is example G because the decreased RAFT permits great coke savings with minimal capital investment. Only a preheater is required, i.e., stoves or a reformer are not required. Example I also has considerable merit as well, depending upon the capital cost of a reformer.

It will be understood various modifications can be made to the invention without departing from the spirit and scope of it. Therefore, the limits of the invention should be determined from the appended claims.

What is claimed is:

1. A method of operating a blast furnace, comprising:
   introducing into the top of the furnace a charge containing metal oxide, coke and flux,
   collecting a top gas CO, $H_2$, carbon dioxide and water from the furnace,
   increasing the reducing potential of said collected top gas by removing water but without removing carbon dioxide from at least a portion of said collected top gas thereby forming a dried top gas, heating said dried top gas to form a heated dried top gas,
   introducing said heated dried top gas into the lower half of the stack of the furnace at a position above which said coke is not reactive and
   introducing an oxygen-containing gas and a hydrogenaceous fuel into the bosh of the furnace whereby said metal oxide is reduced to a molten metal using said heated dried top gas.

2. The method of claim 1 said dried top gas has $\geq 3$ vol. % water.

3. The method of claim 1 wherein said water is removed to $\leq 3$ vol. % by quenching said collected top gas to ambient temperature.

4. The method of claim 1 wherein said dried top gas contains CO, $CO_2$, $H_2$ and $H_2O$, the ratio of said $CO+H_2/CO_2+H_2O$ in said dried top gas is $\geq 1.5$.

5. The method of claim 1 wherein said portion is $\leq 37$ vol. % of said collected top gas.

6. The method of claim 1 wherein the molar ratio of carbon:hydrogen in said hydrogenaceous fuel is less than about 2.5.

7. The method of claim 6 wherein the oxidation state of said dried top gas is less than 10% higher than that of the gases rising from the lower half of the stack of the furnace.

8. The method of claim 1 wherein said heated top gas has a temperature in the range of 900°-1000° C.

9. The method of claim 1 wherein said heated top gas is introduced into the furnace at a position wherein the temperature of said coke is < 1000° C.

10. The method of claim 9 wherein the temperature of said coke is $\geq 950°$ C.

11. The method of claim 1 wherein said oxygen-containing gas is at ambient temperature.

12. The method of claim 1 wherein said hydrogenaceous fuel is at ambient temperature.

13. The method of claim 1 wherein said oxygen-containing gas is at ambient temperature and said hydrogenaceous fuel is reformed at an elevated temperature.

14. The method of claim 1 wherein the physical RAFT of the furnace is between 1750°-2100° C.

15. The method of claim 1 wherein said hydrogenaceous fuel includes natural gas.

16. The method of claim 1 wherein said hydrogenaceous fuel includes carbon and hydrogen gas.

17. The method of claim 16 wherein said carbon is a solid or a liquid.

18. The method of claim 16 wherein said carbon is from the group consisting of pulverized coal, pulverized coke, coal breeze, coke breeze, graphite, tar, alcohol and oil.

19. The method of claim 1 wherein said hydrogenaceous fuel includes one or more of natural gas, hydrogen, pulverized coal, pulverized coke, coal breeze, coke breeze, graphite, tar, alcohol and oil.

20. A method of operating a blast furnace, comprising:

introducing into the top of the furnace a charge containing metal oxide, coke and flux, collecting a top gas CO, $H_2$, carbon dioxide and water from the furnace, increasing the reducing potential of said collected top gas by removing water but without removing carbon dioxide from at least a portion of said collected top gas to $\leqq 3$ vol. % thereby forming a dried top gas, heating said dried top gas, to form a heated dried top gas introducing said heated dried top gas into the lower half of the stack of the furnace at a position wherein the temperature of said coke is <1000° C., introducing an oxygen-containing gas and a hydrogenaceous fuel into the bosh of the furnace, said oxygen-containing gas containing at least 70 vol. % oxygen with the balance being essentially nitrogen and said hydrogenaceous fuel having a molar ratio of carbon:hydrogen less than about 2.5 whereby said metal oxide is reduced to a molten metal using said heated dried top gas.

21. A method of operating a blast furnace, comprising:

introducing into the top of the furnace a charge containing iron ore, coke and flux, collecting a top gas CO, $H_2$, carbon dioxide and water from the furnace, increasing the reducing potential of said collected top gas by removing water but without removing carbon dioxide from at least a portion of said collected top gas to $\leqq 3$ vol. % thereby forming a dried top gas, said dried top gas containing CO, $CO_2$, $H_2$ and $H_2O$, heating said dried top gas to form a heated dried top gas to a temperature between 900°–1000° C., the ratio of said $(CO+H_2)/(CO_2+H_2O)$ in said heated dried top gas being $\geqq 1.5$ wherein said ratio is indicative of said reducing potential of said heated dried top gas, introducing said heated dried top gas into the lower half of the stack of the furnace at a position wherein the temperature of said coke is 950°–1000° C., introducing an oxygen-containing gas and a hydrogenaceous fuel into the bosh of the furnace, said oxygen-containing gas containing 70–90 vol. % oxygen, balance essentially nitrogen, said hydrogenaceous fuel having a molar ratio of carbon:hydrogen in the range of 0.5–2.5, said oxygen-containing gas and said hydrogenaceous fuel being at ambient temperature and the physical RAFT of the furnace being between 1750°–2100° C. wherein said iron ore is reduced to molten iron using said heated dried top gas.

* * * * *

UNITED STATES PATENT AND TRADEMARK OFFICE
CERTIFICATE OF CORRECTION

PATENT NO.  : 5,234,490                                    Page 1 of 2
DATED       : August 10, 1993
INVENTOR(S) : David M. Kundrat It is certified that error appears in the above-indentified patent and that said Letters Patent is hereby corrected as shown below:

Columns 7 and 8, lines 1 and 2, after "Top Gas - Total" in TABLE 2, the expression "-CO-$CO_2$-$H_2$- and -$N_2$ moles/mole Fe" should read --moles CO/mole Fe--.

Columns 7 and 8, lines 3 and 4, after "Top Gas - Total" in TABLE 2, the expression "-CO-$CO_2$-$H_2$- and -$N_2$ moles/mole Fe" should read --moles $CO_2$/mole Fe--.

Columns 7 and 8, lines 5 and 6, after "Top Gas - Total" in TABLE 2, the expression "-CO-$CO_2$-$H_2$- and -$N_2$ moles/mole Fe" should read --moles $H_2$/mole Fe--.

Columns 7 and 8, lines 7 and 8, after "Top Gas - Total" in TABLE 2, the expression "-CO-$CO_2$-$H_2$- and -$N_2$ moles/mole Fe" should read --moles $N_2$/mole Fe--.

Columns 7 and 8, line 1 after "Top Gas - Recycled to Stack" in TABLE 2, the expression "moles/mole Fe" should read --moles CO/mole Fe--.

Columns 7 and 8, line 2, after "Top Gas - Recycled to Stack" in TABLE 2, the expression "moles/mole Fe" should read --moles $CO_2$/mole Fe--.

Columns 7 and 8, line 3, after "Top Gas - Recycled to Stack" in TABLE 2, the expression "moles/mole Fe" should read --moles $H_2$/mole Fe--.

UNITED STATES PATENT AND TRADEMARK OFFICE
CERTIFICATE OF CORRECTION

PATENT NO. : 5,234,490
DATED : August 10, 1993
INVENTOR(S) : David M. Kundrat

It is certified that error appears in the above-indentified patent and that said Letters Patent is hereby corrected as shown below:

Columns 7 and 8, line 4, after "Top Gas - Recycled to Stack" in TABLE 2, the expression "moles/mole Fe" should read --moles $N_2$/mole Fe--.

Columns 7 and 8, second line from the bottom in TABLE 2, the expression "Coke - MT/MTHM" should read --net coke rate saved - MT/MTHM--.

Column 10, claim 2, the expression "$\geq 3$ vol.% water" should read --$\leq 3$ vol.% water--.

Signed and Sealed this

First Day of February, 1994

BRUCE LEHMAN

Attest:

Attesting Officer   Commissioner of Patents and Trademarks